J. C. & L. C. Pluche.
Harvester Cutter.
N° 15084. Patented Jun. 10, 1856.
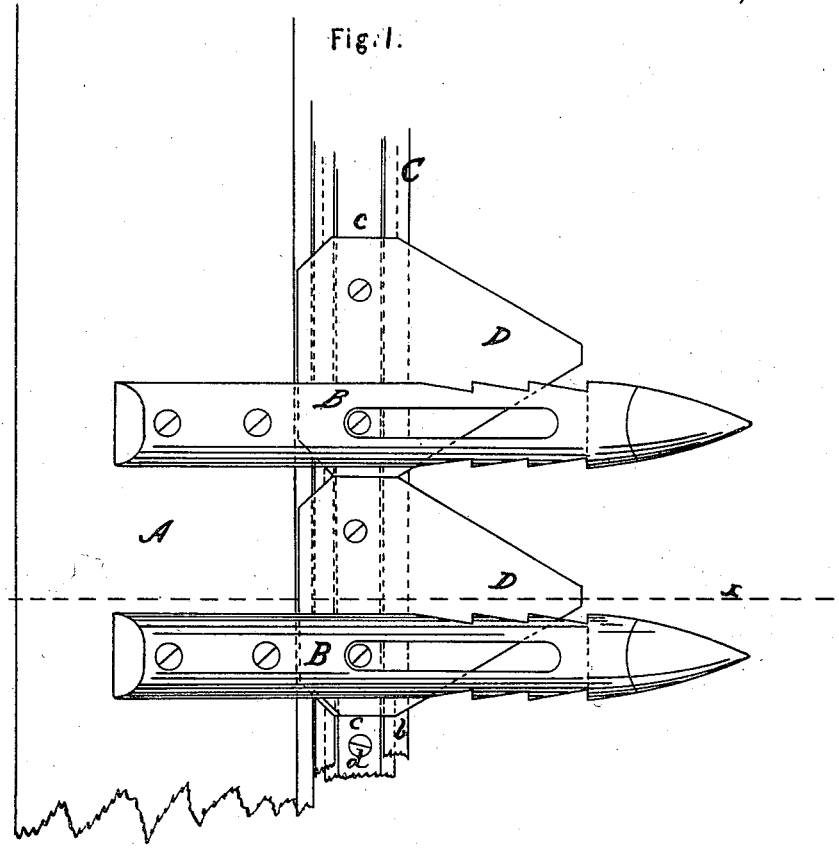
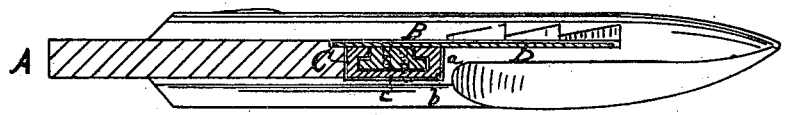

UNITED STATES PATENT OFFICE.

J. C. PLUCHE AND L. C. PLUCHE, OF CAPE VINCENT, NEW YORK.

IMPROVEMENT IN ATTACHING TEETH TO SICKLE-BARS OF HARVESTERS.

Specification forming part of Letters Patent No. 15,084, dated June 10, 1856.

*To all whom it may concern:*

Be it known that we, J. C. PLUCHE and L. C. PLUCHE, of Cape Vincent, in the county of Jefferson and State of New York, have invented a new and improved mode of attaching the teeth of sickles to their bars, so that the teeth of sickles may be readily attached to and detached from the bars, the above implement being designed for the sickles of harvesters; and we do hereby declare that the following is a full, clear, and exact description of the same, reference being had to the annexed drawings, making a part of this specification, in which—

Figure 1 is a plan or top view of a portion of a finger-bar and sickle of a harvester. Fig. 2 is a transverse section of the same, $x\ x$, Fig. 1, showing the plane of section.

Similar letters of reference indicate corresponding parts in the two figures.

Our invention consists in attaching cleats to the back ends of the teeth, and having the sickle-bar grooved to receive the cleats in the teeth, the cleats and groove being made in dovetail form, as will be presently shown and described, whereby the teeth are firmly secured to the sickle-bar, and may be readily attached and detached from it.

To enable those skilled in the art to fully understand and construct our invention, we will proceed to describe it.

A represents the finger-bar of a sickle, to which fingers B are attached in the usual way.

C is the sickle-bar, which is fitted or works in grooves or recesses $a$ at the back parts of the fingers B, as usual. The sickle-bar has a longitudinal groove, $b$, made in it, the lower part of which is wider than the upper part, as shown clearly in Fig. 2.

D represents the teeth of the sickle. These teeth are of the usual form and have cleats $c$ firmly attached to their back parts on their under sides. The cleats $c$ correspond inversely in form with the groove $b$ in the bar C, as shown clearly in Fig. 2. The cleats $c$ are fitted in the groove $b$ in the bar C, and the cleats on the teeth at the extreme ends of the sickle are secured to the bar C, as shown at $d$. By this means the teeth are prevented from moving or working laterally in or on the bar, the dovetail form of the groove $b$ and cleats $c$ preventing the teeth from working or moving vertically.

The above improvement is extremely simple, and the teeth may be readily detached from the sickle-bar when they require to be ground, and may be readily attached to the bar.

Having thus described our invention, what we claim as new, and desire to secure by Letters Patent, is—

Attaching the teeth D of the sickle to the bar C by the cleats $c$, secured to the back ends of the teeth, the cleats being fitted in a groove, $b$, in the bar C, substantially as shown and described.

J. C. PLUCHE.
L. C. PLUCHE.

Witnesses:
CHAS. W. ROGERS,
LORENZO D. TARBLE.